United States Patent [19]
Murphy

[11] 3,814,270
[45] June 4, 1974

[54] DEVICE FOR EMPTYING CONTAINERS

[75] Inventor: Richard D. Murphy, Grand Rapids, Mich.

[73] Assignee: Corduroy Rubber Company, Grand Rapids, Mich.

[22] Filed: Sept. 22, 1972

[21] Appl. No.: 291,306

[52] U.S. Cl............ 214/302, 198/37, 214/314, 222/55, 222/166
[51] Int. Cl............................................ B65g 65/04
[58] Field of Search...... 222/55, 166; 214/302, 303, 214/307, 312, 314; 198/37, 40

[56] References Cited
UNITED STATES PATENTS

| | | | |
|---|---|---|---|
| 2,157,642 | 5/1939 | Vosler............................ | 214/314 |
| 2,344,664 | 3/1944 | Adams............................ | 214/307 |
| 2,794,575 | 6/1957 | Hall.................................. | 214/314 |
| 2,858,949 | 11/1958 | Doepke et al................. | 214/314 |
| 2,905,344 | 9/1959 | Hostetler et al............... | 214/314 |
| 3,064,357 | 11/1962 | Butters........................... | 198/37 |
| 3,659,731 | 5/1972 | Carson........................... | 214/314 |
| 3,717,270 | 2/1973 | Rooke et al................... | 214/307 |

*Primary Examiner*—Albert J. Makay
*Assistant Examiner*—Lawrence J. Oresky
*Attorney, Agent, or Firm*—Price, Heneveld, Huizenga & Cooper

[57] ABSTRACT

An unloading bin having an open top and front is rotatably supported about its center on a frame above an open topped hopper. The bin is rotatable about a horizontal axis centered with respect to the bin at selected rates from a "top-up" position to an inverted "bottom-up" position. An open-topped parts container is positionable in the bin through the open front and tilted rearwardly to empty the parts into the hopper by gradual rotation of the bin. Rods across the top of the bin prevent the container from falling out. In a preferred arrangement, the hopper is positioned above a conveyor which receives and removes the parts as they are fed through the hopper. A sensor associated with the conveyor controls the rate of tilt of the bin to control the rate of emptying.

3 Claims, 5 Drawing Figures

PATENTED JUN 4 1974

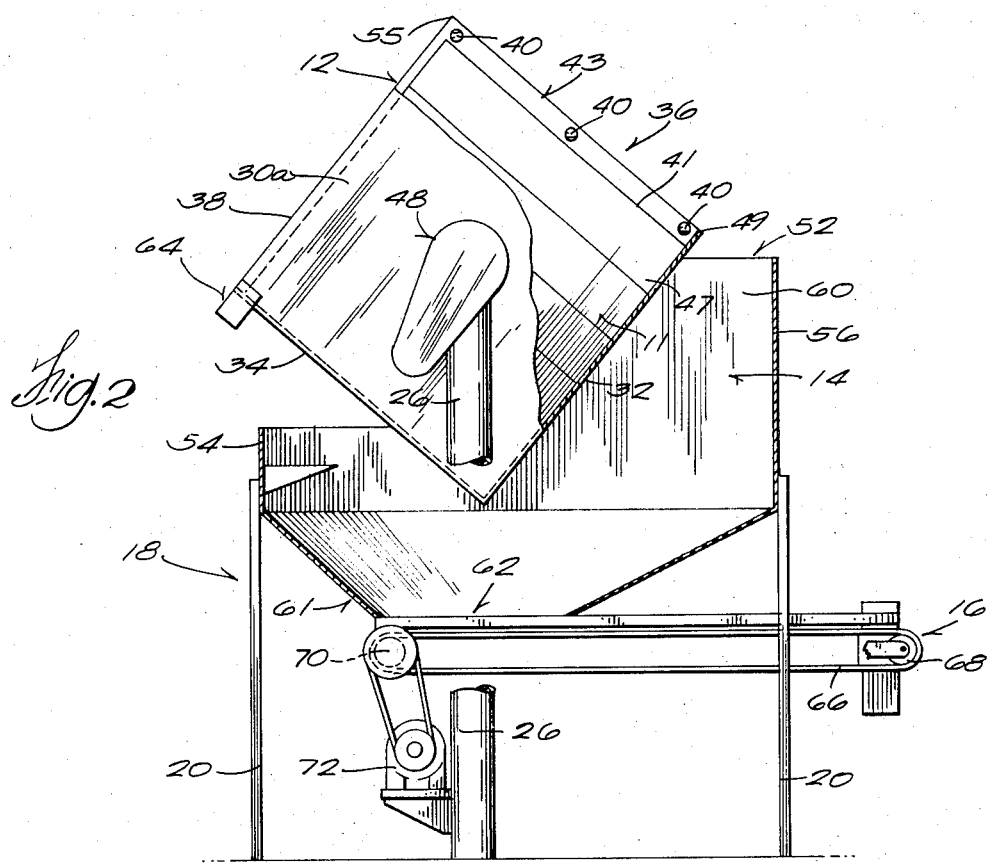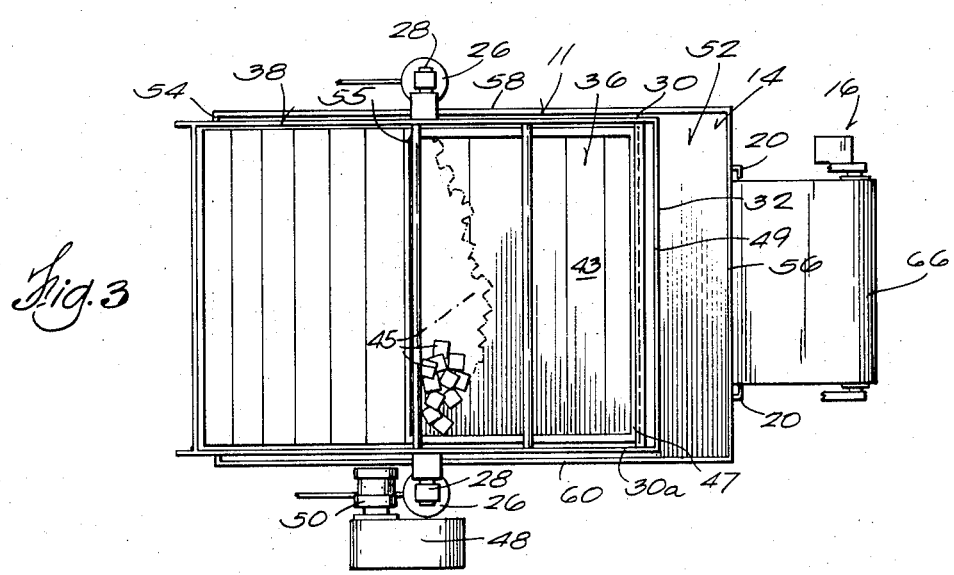

1

DEVICE FOR EMPTYING CONTAINERS

BACKGROUND OF THE INVENTION

1. Field of the Invention

This invention relates to an unloading device and more specifically to one for emptying containers loaded with randomly shaped parts having a high coefficient of friction or susceptible to bridging.

2. Statement of the Prior Art

In many industries such as the automobile industry, a multitude of relatively small parts are utilized which are shipped in bulk quantities in relatively standard size containers. Unlike a more homogeneous product such as fruit, grain or coal etc., these parts are randomly shaped and even though identical to each other they are susceptible to bridging or becoming hung up in the container making it difficult to empty them mechanically in accordance with the present state of the art. Also, when the container is tilted they have a steep angle of repose, requiring the container to be inverted to discharge the last of them.

The prior art teaches a type of device which tilts a container about an axis through one of its upper margins to unload the goods contained therein. A principal drawback to this type of container is that it requires a large amount of lateral and vertical space to rotate the device through a full 180°. This necessitates both an oversized structure and utilizes excessive floor and ceiling space, the costs of which are critical in a manufacturing plant. Another significant drawback to this type of device is the stresses and strains imparted on the support and rotational apparatus since the center of mass of the parts being emptied is displaced from the axis of rotation at various degrees creating a substantial moment arm about the rotational axis. The structural requirements of the device make it very costly. Yet another disadvantage is that the prior art devices do not provide a device which readily receives an open topped container which is held securely from movement during the tilting and emptying function.

Utilizing present emptying techniques, the parts tend to be bunched into groupings of too many or too few as they are emptied. Ideally, the parts are emptied onto a conveyor, sorting and/or counting mechanism which devices are subject to jamming if too many parts are received at one time. On the other hand, these devices do not function properly if too few parts are intermittently fed through them. Thus, there is a need in this art for an improved device for emptying such parts at a relatively uniform rate from a container.

SUMMARY OF THE INVENTION

In dispensing, sorting and/or counting randomly shaped parts shipped in bulk in a container, the parts are emptied into an open topped hopper which has a restricted opening for dispensing the parts as needed, as for example onto a conveyor means of some type. Frequently, the parts pass from the conveyor to some type of processing equipment such as for cleaning, machining, painting, etc.

In accordance with the invention, a support capsule is positioned above the open top of the hopper for rotation about a horizontal axis passing generally through its vertical and horizontal center. The capsule has an open side to permit insertion and removal of an open topped parts container which is inhibited by the capsule configuration against moving during rotation from a "top-up" position to an inverted "top-down" position. The top of the capsule is open so that as the capsule is rotated, the parts contained in the container are gradually deposited into the hopper. Means are provided however to prevent the container from falling out of the open top.

In more narrower aspects of the invention, the rate of rotation of the capsule is automatically preselected or can be easily altered. In one aspect of the invention, the receiving means beneath the hopper is a conveyor which includes a sensor associated with the capsule mechanism to initiate further tilting thereof in the absence of the presence of parts on the conveyor from the hopper.

In the preferred embodiment, the capsule is a fully enclosed bin having an open top and front, the open top having one or more rods extending across it to retain the container therein as the bin is rotated. The bin includes a pair of legs positionable on stops provided on the hopper when the bin is in the upright position so that as the container is loaded any excessive load imposed on the capsule during loading is absorbed by the bin structure rather than the capsule pivots. Once the capsule is loaded, the weight is approximately equally distributed about the rotational mounting of the frame structure.

By rotating the container about its central axis the size of the hopper and the height of the equipment is materially reduced—an important factor in facilities having limited space available. Also, the central axis of rotation significantly reduces the force necessary to operate the device since the distance of the center of mass during rotation is always close to the axis of rotation when compared with the devices of the prior art. Thus, the support structure, power mechanism, and gearing etc. can all be smaller and hence more economical compared to present arrangements.

DESCRIPTION OF THE DRAWINGS

FIG. 2 is a partially cut-away partially sectional side elevation view of the device shown in FIG. 1, portions of which are in cross-section;

FIG. 3 is a plan view of the device illustrated in the same position of tilt illustrated in FIG. 2;

DESCRIPTION OF THE PREFERRED EMBODIMENT

Figure 1:
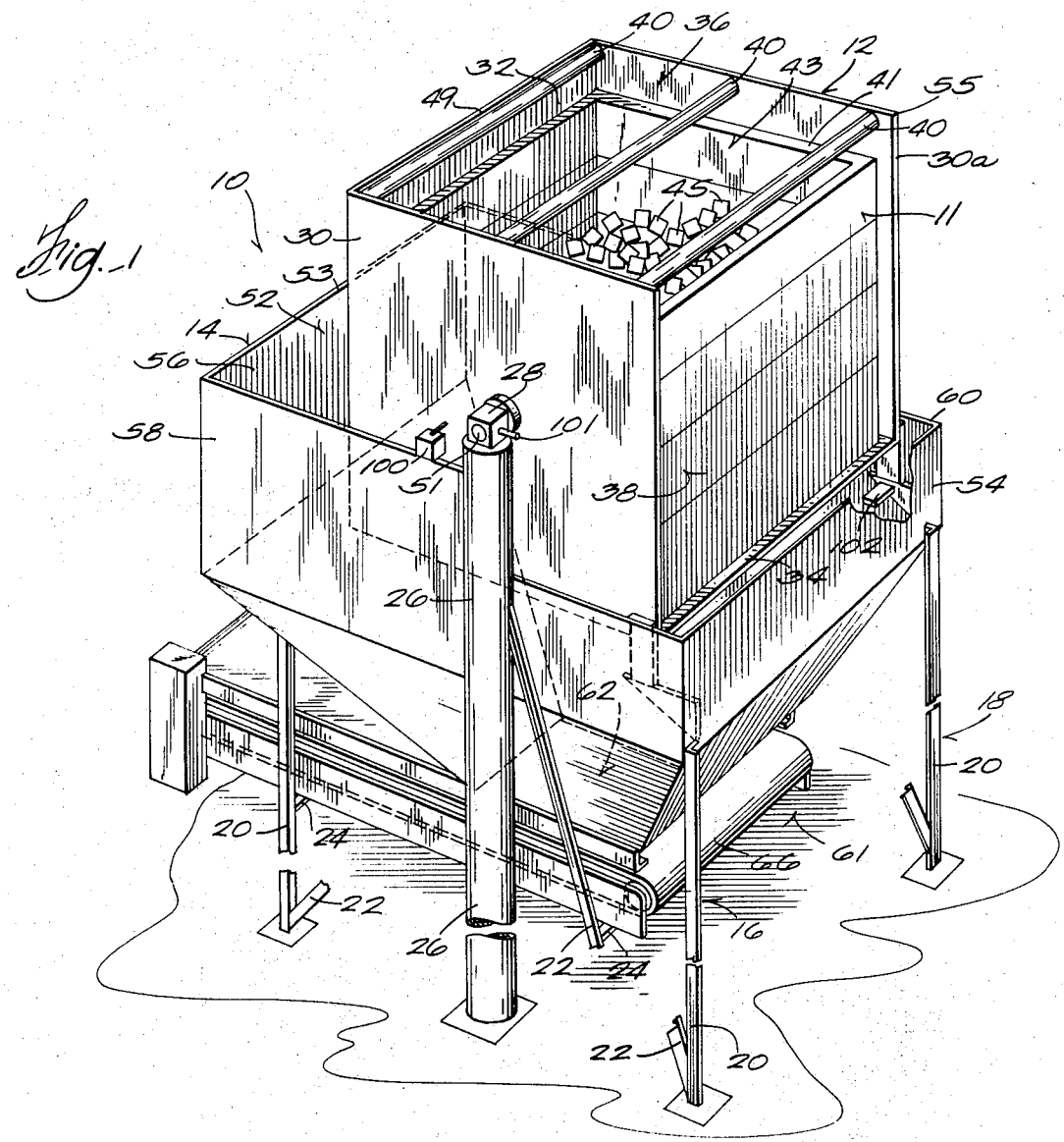
FIG. 1 is a perspective view of the unloading device of my invention.

Referring now to the drawings in detail, FIG. 1 illustrates an unloading device 10 for emptying parts from an open topped container or crate 11. The device 10 is comprised of a crate receiving and holding capsule 12 positioned above a hopper 14 which in turn is positioned above a conveyor 16. Hopper 14 is supported by a frame 18 comprising a plurality of corner posts 20 and strategically placed cross supports 22. The conveyor 16 is likewise supported by frame 18 and a second set of cross supports 24. The exact structural arrangement of frame 18 is well within the ability of one skilled in this art and hence is not described in further detail.

Capsule 12 is suspended above hopper 14 by a pair of stanchions 26 located on each side of device 10. The capsule is secured to the upper ends of stanchions 26 by a bearing assembly 28 which allows capsule 12 to rotate about a horizontal axis extending generally through the vertical and horizontal center of capsule 12.

As illustrated in FIGS. 1–3, capsule 12 is comprised of a pair of side panels 30, 30a; rear wall panel 32 and bottom panel or platform 34. The top 36 is open, as is the front 38. A plurality of rods 40 extend across the open top so that when crate 11 is positioned within capsule 12, the crate is restrained from movement relative to capsule 12 except in the direction through open front 38. Crate 11 has a generally standardized size to permit insertion in and removal from capsule 12 by convenient means such as a fork lift truck. Although not shown on the drawings, a support pallet is preferably used for the crate to permit easy handling of the crate. With a pallet positioned beneath the crate, the upper margin 41 of the crate will be in close proximity to rods 40 so that when the capsule and crate are rotated as a unit, as will be described hereinafter, the parts within crate 11 will be free to discharge through the open top 43 of the crate and through the open top 36 of capsule 12 although the crate will be confined by rods 40 from falling out of the capsule even though the crate is inverted.

Referring to FIGS. 2 and 3, capsule 12 is mounted to stanchions 26 for rotational movement relative to hopper 14. The capsule is pivotable through approximately 180° of arc between a first position as illustrated in FIG. 1 wherein capsule 12 is in a generally upright "top-up" attitude to an inverted "bottom-up" position wherein the open top 36 faces downwardly. In accordance with the actuating mechanism which rotates the capsule, it can also be brought to any position intermediate the first and second positions such as the one shown in FIG. 2.

Although rods 40 prevent crate 11 from falling through open top 36 as the capsule is rotated to an inverted position, it is not necessary to utilize a restraining means with respect to open front 38. When the capsule is loaded with crate 11 as shown in FIG. 1, the forces acting on the crate do not urge it sideways. As the capsule is rotated, the weight of the crate and the parts in it will bias it against falling out. In fact it will be urged in the opposite direction against rear wall panel 32. In the fully inverted position, the forces acting on crate 11 will be similar to that when it is loaded except that the crate will be resting on rods 40. Since no restraining means is utilized in the preferred embodiment, it is important that the capsule does not rotate in excess of 180° or there will be a force vector acting on the crate urging it to slide out through the open front 38.

Since the capsule and crate are rotated about their center, the problems of momentum and load moment arms are at a minimum and the effect of centrifugal force does not cause any problem since the angular velocity is too small. By leaving front 38 entirely open, loading and unloading of crate 11 is greatly simplified. Rotation about the center also reduces the amount of space needed to provide adequate clearance in and around device 10. Thus, valuable factory space is saved in accordance with the present invention. Yet another aspect of this invention is a reduction of the amount of shielding required to protect against accidental discharge of parts as the capsule and crate are rotated. The rotation about their center not only saves space, it reduces the centrifugal forces on the parts 45 as the capsule rotates, the latter being a function of both the velocity and radius of rotation. Hence a compact device having low operating power requirements is provided.

The principal function of unloading device 10 is to discharge parts 45 as capsule 12 is rotated by gravitationally forcing the parts in the crate 11 to fall out the open tops 36 and 43 of the capsule and into hopper 14. As the capsule is rotated counter-clockwise as shown in FIG. 1 or clockwise as shown in FIGS. 2 and 3, parts 45 shift and ultimately fall through tops 36 and 43 over the rear upper margins 47 and 49 of the crate and capsule.

The side panels 30, 30a of capsule 12 are each mounted to the upper ends of stanchions 26 by a stud shaft 51 (FIG. 1) which extends through each bearing into both side panels 30, 30a. One of the stanchions includes a gear and drive belt arrangement 48 (FIGS. 2 and 3) actuated by a reversible, preferably variable speed electric motor 50 which supplies the power to rotate capsule 12 as described. An appropriate speed reducer is provided so that the increments of rotation can be effectively selected both as to their magnitude and rate. The exact details of the gear reduction are not described in detail since they are mechanical expedients well known in the art. It is significant, however, that the axis of rotation of capsule 12 is through its vertical and horizontal center. This substantially reduces the magnitude of any moment arm about the stanchions as the load of parts rotates during emptying. This permits the utilization of relatively lightweight equipment including the motors, gearing, speed reducers, and bearings etc., as well as the strength and bracing of the stanchions, all of which greatly reduces the overall cost when compared with known devices.

Hopper 14 illustrated in the drawings has an open top 52, front and rear panels 54 and 56 and side panels 58 and 60. The bottom 61 of the hopper is in the form of an irregular truncated frustum narrowing down at the bottom to form a restricted opening 62 through which the parts received in hopper 14 are allowed to discharge onto conveyor 16, the latter to be described in more detail hereinafter.

Referring to FIG. 1, the stanchions 26 extend up along the side of side panels 58 and 60 and are slightly off center with respect to the side panels so that when the capsule 12 is rotated in a counter-clockwise direction (FIG. 1), the rear upper margin 49 of capsule 12 will always be above and to the right of the rear upper margin 53 of hopper 14. The entire open top 36 is always positioned above the open top 52 of hopper 14 regardless of the position of capsule 12. The capsule is capable of rotation through a 180° arc from the "top-up" to the "bottom-up" position, and in all instances, the open top 36 is above hopper 14 so that all discharged parts will be deposited into hopper 14. Thus, the distance from stanchion 26 to the vertical plane which includes rear panel 56 of hopper 14 is greater than the distance from the axis of rotation through shaft 51 to both the rear upper margin 49 and front upper margin 55 of capsule 12. Since the axis of rotation of capsule 12 is located at its vertical and horizontal center, the distance from the axis of rotation to margins 49 and 55 are equal.

The configuration of side panels 30 and 30a are irregular in that the height of rear panel 56 is greater than front panel 54. The reason for this is that when capsule 12 is in its normal load (top-up) position as illustrated in FIG. 1, the open front 38 is essentially aligned with front panel 54 of the hopper. As the lower front margin 64 of capsule 12 swings out as the capsule is rotated, it moves slightly beyond the vertical plane of front panel 54 as shown in FIGS. 2 and 3 and hence front panel 54 cannot extend above the bottom of capsule 12 when in its normal load position. On the other hand, the rear panel 56 is preferably higher than front panel 54 to prevent any of the parts 45 from accidentally falling out of the hopper as the capsule is rotated. Thus, the preferred configuration of side panels 30 and 30a is an overall L-shape with the rear portion of the panel extending directly from the top margin 53 of rear panel 56 over to stanchion 26 and then down to the height of front panel 54. This is clearly illustrated in FIG. 1. Thus, both the rear portions of the side panels and rear panel itself extend above the level of the front panel to prevent the parts from being accidentally discharged over the end of the hopper.

As the parts are tumbled from capsule 12 into hopper 14, they are directed to the restricted opening 62 in the bottom of the hopper onto a conveyor mechanism 16. The conveyor mechanism can be utilized for a variety of functions such as counting, sorting and transferring the parts for processing, distribution or packaging. The conveyor itself is anchored to support frame 18 by cross supports 24 and is conventionally comprised of an endless belt 66 movable around an idler roller 65 (FIG. 2) and drive roller 70 driven by a motor 72.

Figure 5:
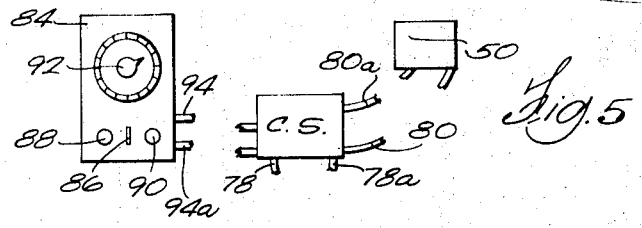
FIG. 5 is a schematic view of the control mechanism of the invention.

A sensing mechanism 74 (FIG. 4) is associated with conveyor 16 and electrically interconnected to electric motor 50 shown schematically in FIG. 5 which operates the rotational movement of capsule 12. Sensor 74 is comprised of a pivot arm 76 pivotable about a horizontal axis "A" above conveyor belt 66 so that pivot arm 76 can swing between a first position wherein it extends vertically down with its lower margin 75 just above the upper surface of conveyor belt 66 to a second position wherein it extends at an angle to the vertical with its lower margin out away from belt 66 as shown in phantom in FIG. 4. Pivot arm 76 is weight biased to its vertical first position.

Figure 4:
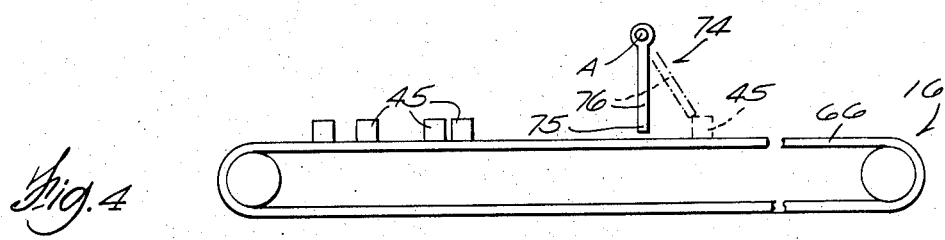
FIG. 4 is a partial view in elevation of the conveyor shown in FIGS. 1–3 as well as the sensing mechanism of the invention.

A number of parts 45 are illustrated in FIG. 4 on belt 66 which parts have been discharged on the conveyor from hopper 14 through the restricted opening 62. The force of any one of the parts 45 is sufficient when brought into abutment with pivot arm 76 to move the arm toward the position illustrated in phantom in FIG. 4. It will be appreciated that pivot arm 76 will be moved into this position only when parts are present on conveyor belt 66. In the absence of parts moving with the conveyor, privot arm 76 will assume its vertical position illustrated in solid lines in FIG. 4. Thus, pivot arm 76 is, in effect, a sensor capable of providing an output indication that parts are or are not on the conveyor.

The mechanical movement of pivot arm 76 is sufficient to open or close a pair of electrical contacts (not shown) which are connected through a pair of lead wires 78, 78a (FIG. 5) to a control circuit C.S. which is in turn electrically interconnected through lead wires 80, 80a to electric motor 50 for rotating capsule 12. The design of the electrical circuitry illustrated in FIG. 3 is such as to cause actuation of the motor 50 for further rotation of capsule 12 in the counter-clockwise direction illustrated in FIG. 1 when the conveyor mechanism 16 is operating and no parts are present on the conveyor. As will be discussed briefly hereinafter, other control mechanisms are present in the system which may override the operation of sensor 74, but the essential features provided by it are to initiate further rotation of the capsule 12 when no parts are present on the conveyor.

A separate control box 84 is illustrated in FIG. 5 and is provided with an on-off switch 86 and direction selection switches 88 and 90, the latter being utilized to select the direction of rotation of capsule 12 to empty the contents of crate 11 held by capsule 12, or after it has reached its inverted position, to reverse the direction of the capsule to receive a new crate. Generally, the reversal of rotation is automatically initiated by proper solenoids (not shown) which reverse motor 50 as soon as the capsule and crate reach an inverted position. However override switches are available to permit an attendant to arbitrarily select the direction and speed of rotation. This is necessary for obvious safety reasons.

In addition, a rate selection switch 92 is provided wherein, it is possible to select the rate or time in which it takes for the capsule to move from its upright position shown in FIG. 1 to a fully inverted position. This is significant in that a variety of different types of parts are unloaded utilizing device 10 and hence in certain instances, it is necessary to rotate the capsule faster for the purposes of one type of part as compared with another. The control box 84 is interconnected to control circuit C.S. by lead wires 94, 94a. The control circuit and related switch boxes are quite sophisticated in that in the preferred embodiment, a wide latitude of utility is desired. Hence, it is desirable to allow a wide selection of automatic features as well as complete and instantaneous direct control over the movement of the capsule when required. Only a basic circuit is schematically illustrated in the drawings although it will be appreciated that great latitudes in commands are achievable depending on the need.

As one example, for a multitude of relatively small parts, the actuation of the circuit control could provide initial rotation of capsule 12 through a selected angular rotation at a preselected speed. After completing this partial cycle, the capsule would stop until actuated by sensing mechanism 74 which would call for partial rotation through a second preselected angle and so on until the capsule is inverted. Return rotation of course could be at a greater speed to expedite the unloading and loading process.

OPERATION

Having described the various elements and their relationships, the operation of the container unloading device 10 will be described. With a capsule 12 in its normal "top-up" position as illustrated in FIG. 1 a crate 11 containing a plurality of parts 45 is loaded into the capsule by insertion horizontally through the open front 38 of the capsule. Depending on the size, configuration and weight of the parts, the rate of rotation of capsule 12 can be selected by rate selection switch 92 (FIG. 4). This will cause the capsule to rotate through approximately 180° into a fully inverted position at a preselected rate to tumble the entire contents of crate 11 into hopper 14. As noted earlier, this rotation can be in one continuous movement or in timed increments.

On the other hand, if the operation of sensor 74 is desired, after the rate of rotation is selected, the rotation of capsule 12, as described, will be responsive to the presence or absence of parts on the conveyor belt 66. That is, with the capsule in an upright position, and a preselected rate selected, the capsule will begin rotating since pivot arm 76 is in a transverse position over the conveyor indicating the absence of parts on the conveyor. However, as soon as parts begin to discharge from the capsule and reach the conveyor belt, they engage pivot arm 76 and swing it to the position shown in phantom in FIG. 4. Further rotation of the capsule ceases at this point so that an overabundance of parts is not received on conveyor 66. As soon as cessation of the flow of parts from crate 11 into hopper 14 starves the belt of parts, pivot arm 76 will swing back into its vertical position initiating further rotation of capsule 12 at the preselected rate until parts are once more present on the belt. This process of intermittent rotation will continue until all of the parts have been discharged from the crate, at which point the crate will have rotated through a full 180°. Appropriate mechanisms to stop and reverse the operation of the device then take over. For example, a limit switch 100 triggered by the arm 101 can automatically cause the motor to reverse when the capsule reaches its inverted position. Another limit switch 102 can stop the motor when the capsule once again reaches its upright position. These can be automatic. Thus, it will be appreciated that the entire operation of the device of the invention can be fully automatic and, therefore, eliminate the necessity for an attendant to monitor its operation. Means can be connected to the system to sense the return of the capsule to upright position, generating a signal to the operator to reload the capsule. This function can also be performed by the switch 100.

Although but one embodiment has been shown and described in detail, it will be obvious to those having ordinary skill in this art that the details of construction of this particular embodiment may be modified in a great many ways without departing from the unique concepts presented. It is therefore intended that the invention is limited only by the scope of the appended claims rather than by particular details of construction shown, except as specifically stated in the claims.

The embodiments of the invention in which an exclusive property or privilege is claimed are defined as follows:

1. A device for emptying containers comprising, in combination: a support means; a container receiving capsule rotatably mounted on said support means; said capsule having a platform, a pair of sides and a rear wall panel interconnected to each other; said capsule being rotatable about a horizontal axis which passes generally through the horizontal and vertical center of said sides thereof between a first position wherein said capsule is generally horizontal and upright, and a second position wherein said capsule is generally inverted with respect to said first position; said capsule having an open top facing up when said capsule is in said first position and facing down when said capsule is in said second position; said capsule also moving through intermediate positions between said first and second positions such that as said capsule is rotated from said first position toward said second position with a container mounted therein, the contents of the container are gradually discharged by gravity through the open top of the container; said capsule having container restraining means at the top for supporting the container when inverted, said restraining means having at least one opening therein through which the contents of the container are discharged; and means for rotating and controlling the rate of rotation of said capsule between said first and second positions; said capsule having an open front to permit insertion and removal of a container when said capsule is in said first position, said capsule being rotatable from said first position to said second position in a direction away from said front opening to inhibit unintentional movement of the container out of said capsule during rotation thereof; a hopper mounted below said capsule, said hopper having an open top, sidewalls and bottom; means defining an opening in the bottom of said hopper; an endless conveyor positioned beneath said hopper for collecting and moving parts passing through said hopper, said means for rotating and controlling the rate of rotation of said capsule including a prime mover operatively associated with said capsule to rotate the same and a sensor associated with said conveyor and said prime mover to detect the absence of parts on said conveyor when said conveyor is operating whereby said prime mover is activated by said sensor to further rotate said capsule when the absence of parts on said conveyor is detected.

2. The device according to claim 1 wherein said sensor is comprised of an arm pivotal about a horizontal axis above said conveyor, said arm being movable between a first position wherein said arm extends vertically downward toward said conveyor with its lower margin above the upper surface of the conveyor to a second position wherein said arm extends at an angle to the vertical so that its lower margin is spaced a larger distance above the upper surface of the conveyor than when said arm is in said first position, said arm being gravitationally urged into said first position.

3. In combination a container emptying member and a receiving hopper, said emptying member having a pair of supports, one on each side of said hopper and a capsule rotatably supported thereon and over said hopper by a pair of stub shafts; said stub shafts being located midway between the back and front and the top and bottom of said capsule whereby its mass is generally centered about the axis of said stub shafts; means for rotating said capsule about said stub shafts from an upright to an inverted position; control means for selectively regulating the rate of rotation of said capsule; said capsule having a floor, sides and back and spaced restraining members across its top; the front of said capsule being open whereby open-topped containers may be inserted and removed therefrom when said capsule is upright; said restraining members providing openings through which the contents of an open-topped container can freely discharge as said capsule is rotated from an upright to an inverted position in a direction which causes said open front end to pass over the top of said stub shafts; a powered conveyor at the bottom of said hopper providing a restricted discharge therefrom and said control means having an element for detecting the absence of parts on the conveyor when said conveyor is operating whereby said prime mover is activated by said sensor to further rotate said capsule when the absence of parts on said conveyor is detected.

* * * * *